(12) United States Patent
Gaither

(10) Patent No.: US 7,726,477 B1
(45) Date of Patent: Jun. 1, 2010

(54) MEDIA DISC PACKAGE WITH MAGNIFIER ATTACHMENT

(76) Inventor: Deborah L. Gaither, 7865 Ramble View, Unit 102, Cincinnati, OH (US) 45231

( * ) Notice: Subject to any disclaimer, the term of this patent is extended or adjusted under 35 U.S.C. 154(b) by 0 days.

(21) Appl. No.: 12/249,942

(22) Filed: Oct. 12, 2008

(51) Int. Cl.
*B65D 85/57* (2006.01)
(52) U.S. Cl. ............ 206/308.1; 206/457; 220/663
(58) Field of Classification Search .......... 206/308.1, 206/459.5, 457, 316.1, 232; 220/663
See application file for complete search history.

(56) References Cited

U.S. PATENT DOCUMENTS

| | | | | |
|---|---|---|---|---|
| 5,366,073 A | * | 11/1994 | Turrentine et al. | 206/309 |
| 5,544,741 A | * | 8/1996 | Fantone et al. | 206/308.1 |
| 5,833,068 A | * | 11/1998 | Fantone | 206/459.1 |
| 5,941,382 A | * | 8/1999 | Fantone et al. | 206/308.1 |
| 7,044,295 B2 | * | 5/2006 | Sugiyama | 206/308.1 |
| 7,048,117 B2 | * | 5/2006 | Matsuno | 206/308.1 |
| 2004/0089567 A1 | * | 5/2004 | Nacken | 206/308.1 |
| 2004/0256255 A1 | * | 12/2004 | Sugiyama | 206/308.1 |
| 2006/0163090 A1 | * | 7/2006 | Sugiyama | 206/308.1 |

* cited by examiner

*Primary Examiner*—Jacob K Ackun, Jr.

(57) ABSTRACT

The media disc package is a container for holding a media disc, a media disc with fine prints on top, and a magnifier formed of a transparent plastic material with a bar shape, a length of at least 4 inches, and a width of at least ½ inch.

6 Claims, 2 Drawing Sheets

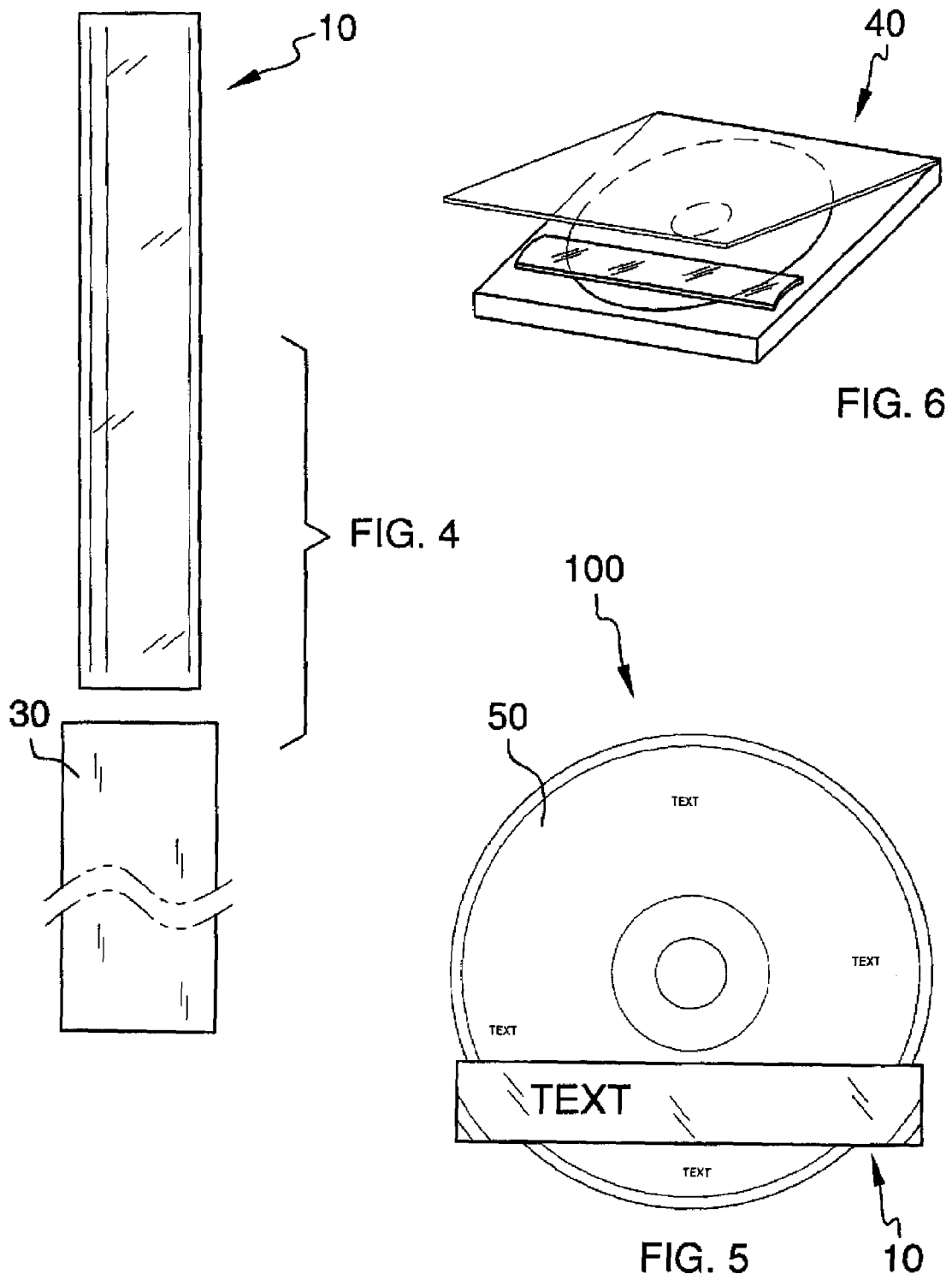

MEDIA DISC PACKAGE WITH MAGNIFIER ATTACHMENT

FIELD OF THE INVENTION

The present invention generally relates to package of media disc and more particularly, relates to a package of media disc that has a magnifier attachment.

BACKGROUND OF THE INVENTION

Media disc have been very popular in recent years. The most widely used media discs are the music CD's and the video DVD's. The media discs are normally laser engraved plastic disc that have a dimension of not larger than 5 inches in diameter. On the media disc, it is desirable to provide the purchasing consumer sufficient information in order to market the product and make it attractive for purchase. One of such important information would be the title, the artist, and otherwise the content of the media disc. For instance, for a music CD disc, the name of the artist, the production company, and the title of the various music pieces would be shown on the disc in order to attract buyers. Due to the small size of the disc, the printed message must be in a small print format and are sometimes difficult to read without a magnifying glass. It is therefore desirable to provide each media disc package with a magnifier attachment such that a person would not need to find a magnifier to read the printing on the disc.

It is therefore an object of the present invention to provide a media disc package that does not have the drawbacks or shortcomings of the conventional media disc packages.

It is another object of the present invention to provide a media disc package that has a magnifier attachment.

SUMMARY OF THE INVENTION

In accordance with the present invention, a media disc package that has a magnifier attachment is provided.

In a preferred embodiment, the present invention, a media disc package is provided with a container for holding a media disc, a media disc that has fine prints on top, and a magnifier formed of a transparent plastic material which has a bar shape, a length of at least 4 inches and a width of at least ½ inch.

BRIEF DESCRIPTION OF THE DRAWINGS

The invention will now be described, by way of example, with reference to the accompanying drawings, in which:

FIG. 4 is a top view of the present invention magnifier attachment with a protective sleeve.

FIG. 5 is an illustration showing how the present invention magnifier attachment is used.

FIG. 6 is an illustration showing a package of the present invention media disc that is equipped with a magnifier attachment.

DETAILED DESCRIPTION OF THE PREFERRED EMBODIMENT

The present invention discloses a media disc package that is equipped with a magnifier attachment.

The present invention media disc package contains a magnifier for reading the small print on CD's and DVD's. The magnifier attachment is shaped like a vertical section a cylinder and would be made of a transparent plastic or glass, that measures about ¼ inch high, about 4¼ inch long, and about ¾ inch wide. The magnifier attachment can be enclosed in a soft, plastic sheath and be included inside a jewel case with a new CD or DVD. The magnifier attachment would fulfill the need for a piece of glass for magnifying the print on CD's and DVD's.

The appealing features of the magnifier attachment would be its clarity, ease of use, and compactness. Many people don't take the time and trouble to read most of the words printed on the CD or DVD because they are too small. This means people are missing out on potentially interesting information such as the titles of the songs, the producers, the production company, etc. The magnifier attachment would solve this problem.

This compact magnifying lens would be included inside the jewel case of a new CD. To prevent the possibility of scratching the CD, the magnifying attachment would be enclosed in a soft, plastic sheath. The lens would be long and thin and could be laid over a few lines of small printed text, making them look much larger and allowing them to read without effort. The magnifying attachment would enhance the enjoyment of CD's and DVD's by providing users with more information about the content.

Figure 1:
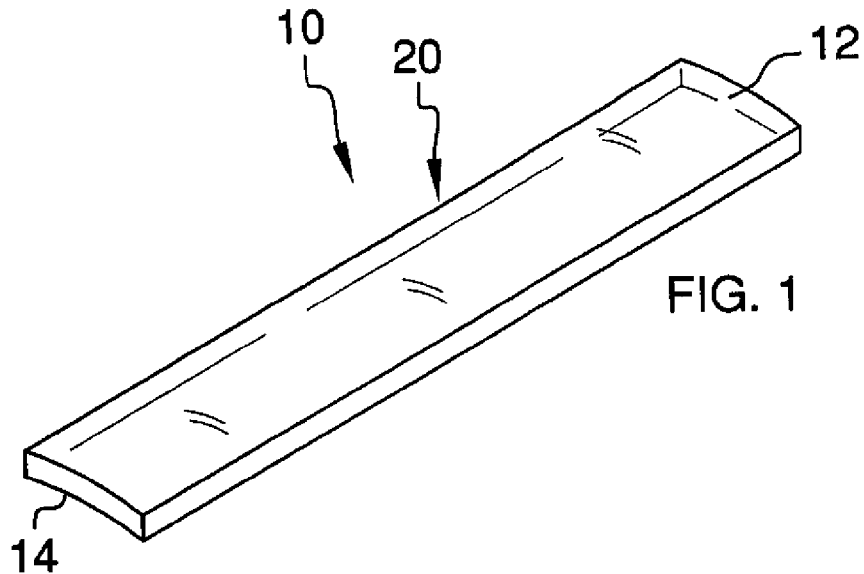
FIG. 1 is a perspective view of the present invention, magnifier attachment.

Referring initially to FIG. 1, wherein the present invention, magnifier attachment 10 is shown. The magnifier attachment 10 is shaped similar to a vertical section of a cylinder, i.e. with a convex top surface 12 and a concave bottom surface 14. The body 20 of the magnifier attachment 10 can be suitably formed of a transparent plastic material, such as Plexiglass® or can be made in glass. A slightly translucent material such as a tinted transparent plastic or a tinted glass may also be utilized. The thickness between the top surface 12 and the bottom surface 14 would determine the degree of magnification. It has been discovered that a suitable thickness for the body 20 is about ¼ inches.

Figure 2:
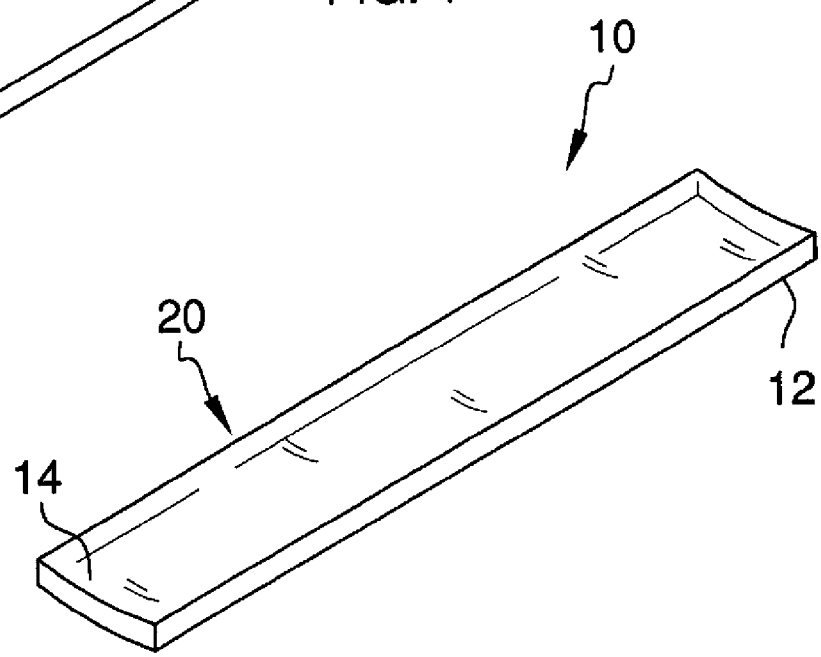
FIG. 2 is a perspective view of the present invention, magnifier attachment in an upside position.
Figure 3:
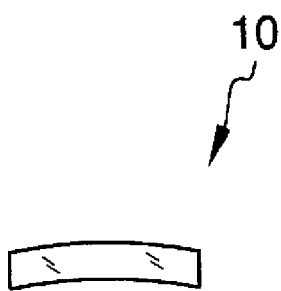
FIG. 3 is a front view of the present invention magnifier attachment.

FIG. 2 is another perspective view of the present invention magnifier attachment 10 with the bottom concave surface 14 facing upwardly. A front view, or an end view of the present invention magnifier attachment 10 is shown in FIG. 3.

In order to avoid scratching or friction between the magnifier attachment 10 and the surface 50 of a media disc 100, shown in FIG. 5, a plastic sleeve 30 may be suitably provided to position the magnifier attachment 10. This is shown in FIG. 4. The use of the present invention magnifier attachment on top of a media disc 100 is also shown in FIG. 5 illustrating the word "media disc 100, shown in FIG. 5, a plastic sleeve 30 may be suitably provided to position the magnifier attachment 10. This is shown in FIG. 4. The use of the present invention magnifier attachment 10 on top of a media disc 100 is also shown in FIG. 5 illustrating the word "media disc 100, shown in FIG. 5, a plastic sleeve 30 may be suitably provided to position the magnifier attachment 10. This is shown in FIG. 4. The use of the present invention magnifier attachment 10 on top of a media disc 100 is also shown in FIG. 5 illustrating the word "TEXT" is magnified to at least four times its size when compared to unmagnified printing on the top surface 50 of the disc 100.

The present invention media disc package 40 which contains the media disc 100 and the magnifier attachment 10 is further shown in FIG. 6. For simplicity reasons, the sleeve 30 is not shown in FIG. 6.

The present invention media disc package equipped with magnifier attachment has therefore been amply described in the above descriptions and in the appended drawings of FIGS. 1-6.

While the preferred embodiments of the invention have been described above, it will be recognized and understood that various modifications can be made in the invention and the appended claims are intended to cover all such modifications which may fall within the spirit and scope of the invention.

What is claimed is:

1. A media disc package comprising:
a container for holding a media disc;
a media disc having fine prints on top; and
a magnifier formed of a transparent plastic having an elongated bar shape, a convex top surface and a concave bottom surface when positioned on said media disc for magnifying said fine prints, a length of at least 4 inches and a width of at least ½ inch.

2. The media disc package according to claim 1, wherein said media disc is fabricated in plastic.

3. The media disc package according to claim 1, further comprising a protective sleeve for holding the magnifier attachment before placed on top of the media disc.

4. The media disc package according to claim 1, wherein said magnifier is formed of a color tinted transparent plastic material.

5. The media disc package according to claim 1, wherein said magnifier has a magnification of at least two times.

6. The media disc package according to claim 1, wherein said magnifier has a magnification of at least four times.

* * * * *